United States Patent [19]
Gandre et al.

[11] Patent Number: 6,040,982
[45] Date of Patent: Mar. 21, 2000

[54] ELECTRONIC SYSTEM IMPLEMENTING REDUNDANT AND NONREDUNDANT POWER SUPPLY CONFIGURATIONS

[75] Inventors: Jerry D. Gandre; Steven L. Sands; R. Steven Mills; Arthur Lopez, all of Austin, Tex.

[73] Assignee: Dell USA, L.P., Round Rock, Tex.

[21] Appl. No.: 08/951,798

[22] Filed: Oct. 16, 1997

[51] Int. Cl.⁷ ................................. G06F 1/16; H05K 7/20
[52] U.S. Cl. .................. 361/724; 361/725; 361/683; 312/223.2; 364/708.1; 307/64
[58] Field of Search ..................... 361/724–727, 361/683, 686, 685; 312/223.2; 364/708.1, 528.21; 307/64, 44, 66, 80, 85

[56] References Cited

U.S. PATENT DOCUMENTS

| | | |
|---|---|---|
| 3,903,404 | 9/1975 | Beall et al. ............................ 361/686 |
| 4,899,254 | 2/1990 | Ferchau et al. ........................ 361/685 |
| 5,656,869 | 8/1997 | Gluskoter et al. ...................... 307/64 |
| 5,684,671 | 11/1997 | Hobbs et al. ........................... 361/683 |

*Primary Examiner*—Leo P. Picard
*Assistant Examiner*—Lisa Lea-Edmonds
*Attorney, Agent, or Firm*—Skjerven, Morrill, MacPherson, Franklin & Friel LLP; Kent B. Chambers

[57] ABSTRACT

An electronic system includes a chassis with attachment features which may interchangeably accept and secure a connector assembly and paralleling board assembly. The connector assembly may be used in a lower cost nonredundant power supply configuration while the paralleling board assembly may be used in multiple power supply configurations. The power supply may be interchangeably connected to the connector assembly and the paralleling board assembly.

40 Claims, 9 Drawing Sheets

ELECTRONIC SYSTEM IMPLEMENTING REDUNDANT AND NONREDUNDANT POWER SUPPLY CONFIGURATIONS

BACKGROUND OF THE INVENTION

1. Field of the Invention

This invention relates to an electronic system and more particularly to an electronic system such as a computer system having a chassis capable of accommodating both redundant and nonredundant power supply configurations.

2. Description of the Related Art

Electronic systems such as computer systems employ power supplies to convert generally readily available time varying alternating current (AC) voltage levels to approximately zero frequency direct current (DC) voltage levels of, for example, 12 Volts (V), 5 V, and 3.3 V. The electronic systems utilize the DC voltages to operate electronic circuitry such as mother boards, disk drives, and peripheral circuit boards.

Some electronic systems are sold with nonredundant power supply configurations. Nonredundant power supply configurations are typically used in lower cost systems where power supply failure is generally more of an inconvenience than a catastrophic event. Nonredundant power supply configurations are generally divided into single power supply and multiple power supply configurations. In the single power supply, nonredundant configuration, a single power supply supplies all power requirements and connects to electronic circuitry such as the mother board and disk drives.

In the multiple power supply, nonredundant configuration, the electronic system requires P watts of power, and N power supplies each provide approximately 1/N times P watts of power, where N is an integer and P is a real number. Thus, if one of the N power supplies fails, the electronic system will fail as the remaining N-1 power supplies cannot provide the complete power requirements. The N power supplies each have connectors that are specially designed for connection to a power supply 'paralleling circuit board' rather than directly to electronic circuitry. The paralleling circuit board approximately evenly divides the electronic system current load among the N power supplies. The paralleling circuit board is securely fixed to a chassis of the electronic system using, for example, screws, and connected to the electronic circuitry to route power to the electronic system.

In the redundant power supply configuration, multiple power supplies are typically also connected via the specially designed connectors to a paralleling circuit board. However, each of the N power supplies are capable of supplying at least 1/(N-1) times P watts of power. If a power supply fails, the paralleling circuit board takes the failed power supply off line and allows the remaining functional N-1 power supplies to continue approximately evenly sharing the electronic system power requirements.

Some conventional systems have nonredundant to redundant power supply configuration upgrade capability. These upgradeable systems are manufactured with the paralleling board securely fixed to the chassis and M power supplies connected to the paralleling board to each supply 1/M times P watts of power to the electronic system, where M is an integer equal to at least one and P is again the electronic system power requirement. The M power supplies are disposed within respective bays in the chassis, and additional vacant bays are provided in the event that the electronic system is upgraded to a redundant power supply configuration. The electronic system can be upgraded to a redundant power supply configuration by installing one or more power supplies into the vacant bays and connecting them to the paralleling circuit board so as to approximately evenly share power requirements.

The upgradeable electronic system is more expensive than a comparable nonupgradeable nonredundant power supply configured electronic system because of the added cost of the paralleling board. Thus, in the event that the electronic system is not upgraded, the upgradeable electronic system is equivalent to the nonupgradeable nonredundant power supply configured electronic system but costs more.

Additionally, servicing a group of electronic systems can be more difficult and costly when the group includes non-redundant single power supply configured electronic systems that do not include a paralleling board and nonredundant and redundant power supply configured electronic systems that include a paralleling board. Because the wiring harnesses of the power supplies that connect directly to electronic circuitry and the wiring harnesses of the power supplies that connect directly to the paralleling board are different, two distinct types of power supplies may be necessary to service the group. Although the two distinct types of power supplies may be equivalent in manufacturing cost, it typically costs more to manufacture and track two different types of power supplies than to manufacture a single power supply type.

Thus, a more cost effective electronic system with improved serviceability is desirable.

SUMMARY OF THE INVENTION

In one embodiment of the present invention, an electronic system implements a flexible design that relatively easily allows a nonredundant power supply configuration without a paralleling circuit board to be upgraded to a multiple power supply configuration with a paralleling board. Additionally, in one embodiment, a single type power supply may be used in both the single and multiple power supply configured systems, thus, providing cost effective interchangeability. In one embodiment, a chassis of the electronic system is configured to interchangeably accept both a connector assembly for a nonredundant configuration and a paralleling board for a multiple power supply configuration. Also, the connector assembly and paralleling board include identical power supply connector types so that a wiring harness of a power supply can be alternatively connected to the connector assembly and the paralleling board.

In another embodiment of the present invention, a computer system includes a microprocessor, a memory coupled to the microprocessor, and a chassis supporting the microprocessor and memory and having a support frame that includes attachment features to interchangeably receive a connector assembly to connect to a first power supply in a nonredundant power supply configuration and a current sharing circuit board to connect to a plurality of power supplies in a multiple power supply configuration.

In another embodiment of the present invention, an apparatus includes a chassis having a support frame that includes attachment features to interchangeably receive a connector assembly to connect to a first power supply in a nonredundant power supply configuration and a current sharing circuit board to connect to a plurality of power supplies in a multiple power supply configuration.

In a further embodiment of the present invention, an electronic system includes a motherboard having a microprocessor and a memory coupled to the microprocessor, a first power supply when the electronic system is configured in a nonredundant power supply configuration, and a plurality of power supplies when the electronic system is configured in a redundant power supplies configuration. The electronic system further includes a first means for distributing power to the motherboard from the first power supply when the electronic system is configured in the nonredundant power supply configuration, a second means for distributing power to the motherboard from the plurality of power supplies when the electronic system is configured in the redundant power supplies configuration, and support means for supporting the motherboard and for supporting the first means when the electronic system is in the nonredundant power supply configuration and for supporting the second means when the electronic system is in the redundant power supplies configuration.

In another embodiment of the present invention, a method of implementing redundant and nonredundant power supply configurations in an electronic system includes the steps of supporting a passive connector assembly with attachment features to connect to a power supply in a nonredundant power supply configuration, and supporting an active current sharing circuit board with the attachment features to couple to a plurality of power supplies in a redundant power supply configuration.

BRIEF DESCRIPTION OF THE DRAWINGS

Features appearing in multiple figures with the same reference numeral are the same unless otherwise indicated.

DETAILED DESCRIPTION OF THE PREFERRED EMBODIMENTS

The following description of the invention is intended to be illustrative only and not limiting.

To provide, for example, flexible computer system configurations and ease of upgradeability, a chassis provides attachment features to accommodate both a connector assembly which supports a nonredundant power supply configuration and a paralleling board (current sharing board) which supports multiple power supplies in either redundant or nonredundant configurations. The chassis thus provides interchangeability between nonredundant power supply configurations and current sharing, multiple power supply configurations. Additionally, the connector assembly and paralleling board may accept identical power supplies in both nonredundant and redundant power supply configurations. The flexible chassis design and interchangeable power supplies offer cost advantages, ease of serviceability, and ease of upgradeability which are often hallmarks of a successful company in the computer industry.

Figure 1A:
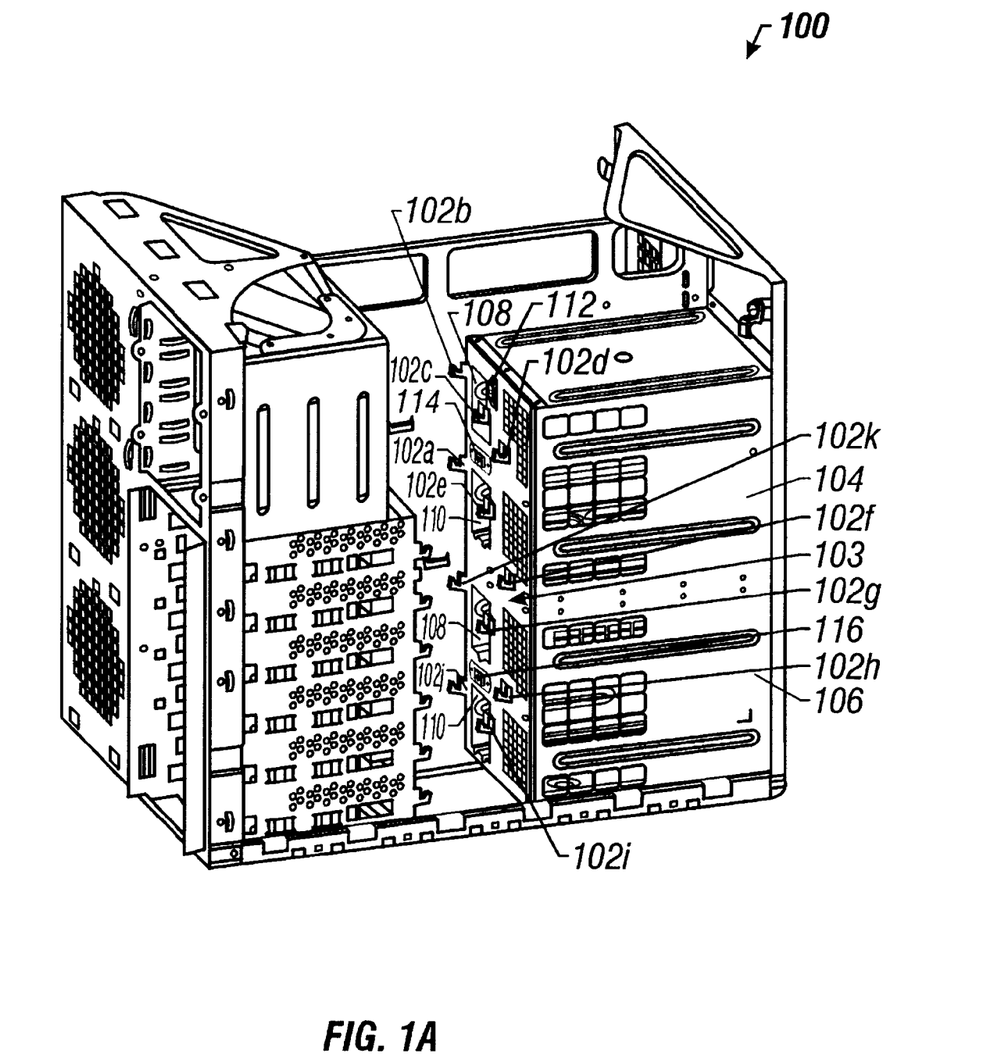
FIG. 1A illustrates a computer system chassis with power coupling circuit support features for single, nonredundant power supply configurations and multiple power supply configurations.
Figure 7:
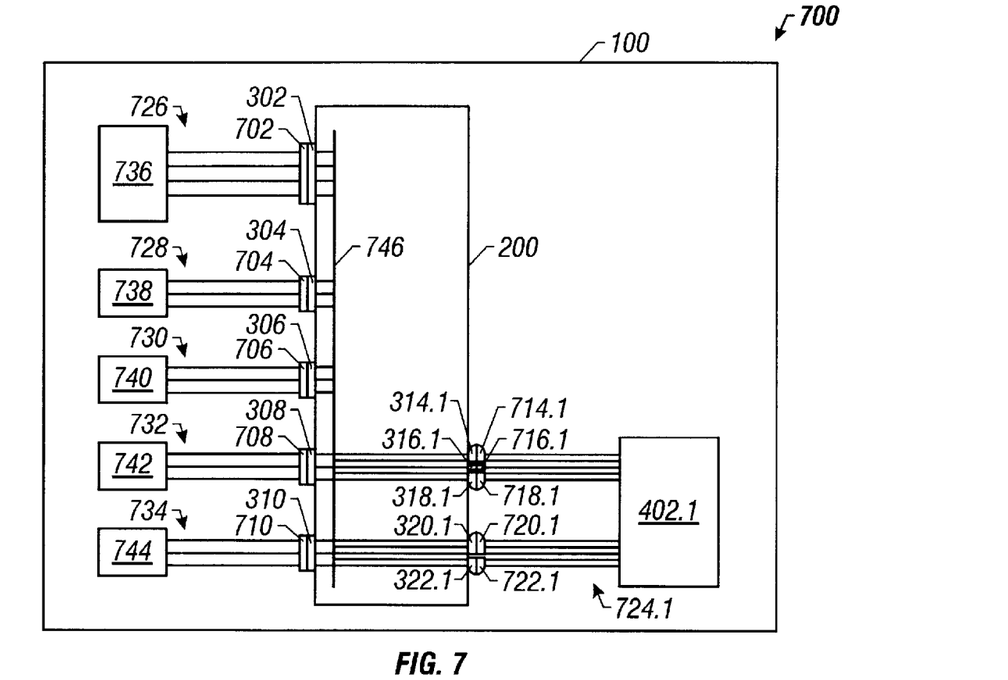
FIG. 7 is a schematic of a nonredundant power supply configuration for the computer system of FIGS. 2 and 4.
Figure 8:
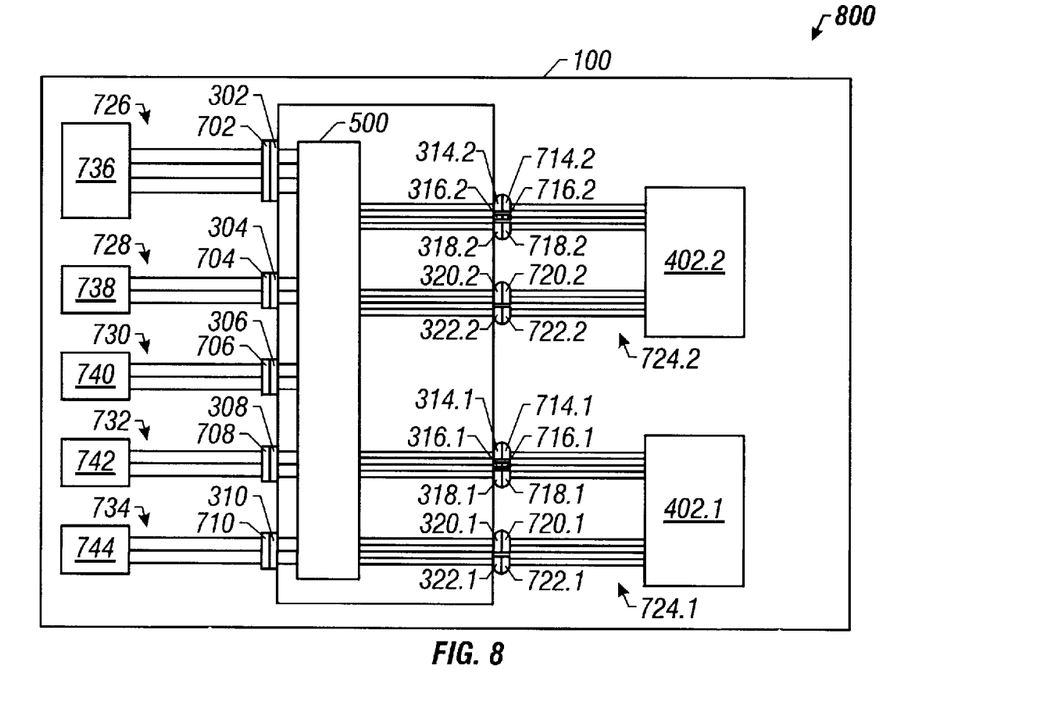
FIG. 8 is a schematic of a multiple power supply configuration for the computer system of FIGS. 5 and 6.

Referring to FIG. 1A, a chassis 100, made of steel, aluminum, or other suitable material, includes power coupling circuit mounting tabs 102a, b, c, d, e, f, g, h, i, j, and k (collectively referred to as mounting tabs 102) to support nonredundant and redundant power supply configurations. The mounting tabs 102 are fabricated as an integral feature of the backplate 103 of two power supply bays 104 and 106, and, in one embodiment, are fabricated to allow folding out ninety degrees from backplate 103 as shown in FIG. 1A. The mounting tabs 102 may also be fabricated separately from the chassis 100 and subsequently affixed using, for example, adhesives, screws, rivets, or other attachment mediums. The power supply bays 104 and 106 each include respective openings 108 and 110 to accommodate power supply connectors (FIGS. 7 and 8).

Figure 1B:
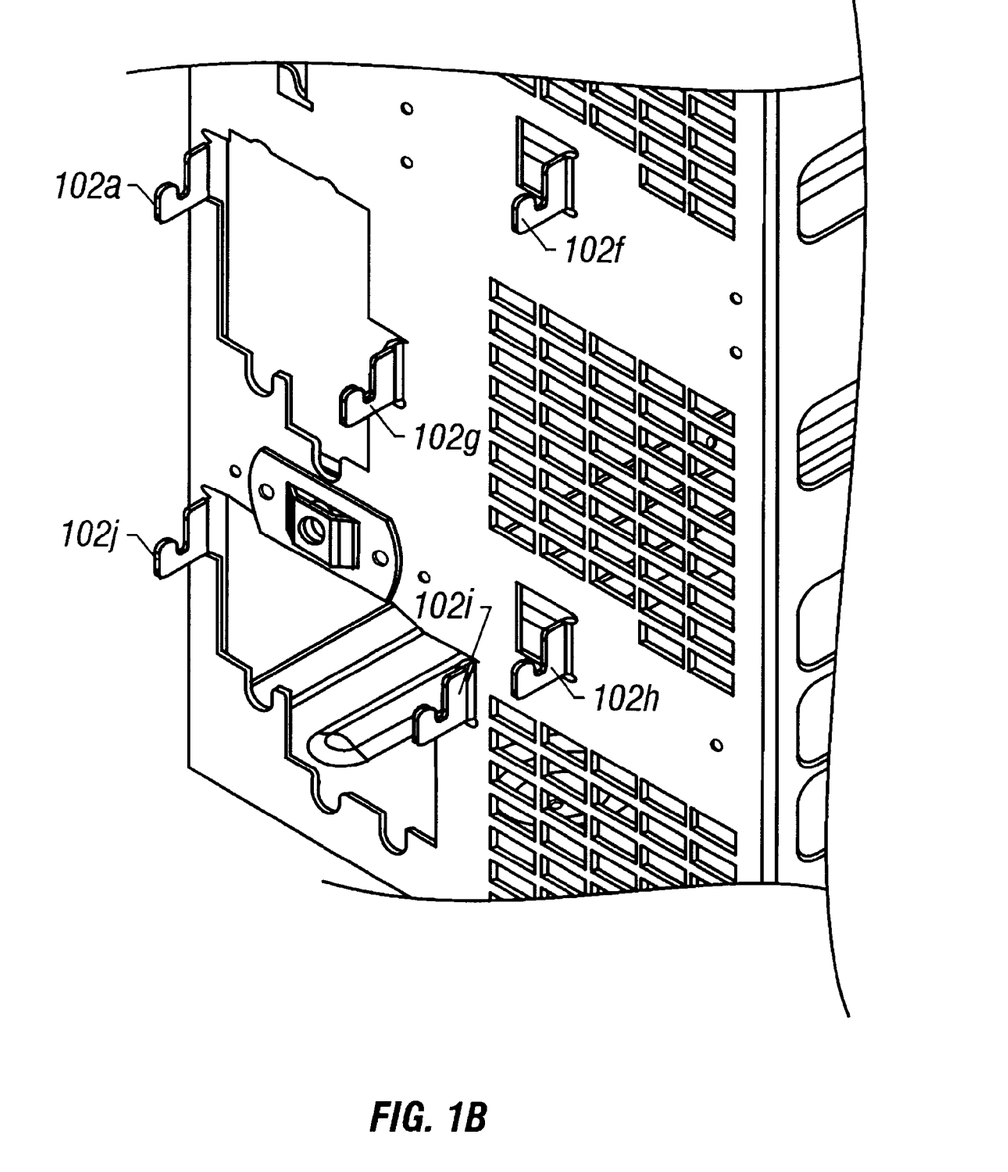
FIG. 1B illustrates an expanded view of mounting tab support features for the computer system chassis of FIG. 1A.

Referring to FIG. 1B, an expanded view of mounting tabs 102a, f, g, h, i, and j illustrate one mounting tab configuration embodiment. Mounting tabs 102b, c, d, e, and k (not shown in FIG. 1B) are identical to mounting tabs 102a, f, g, h, i, and k.

Figure 2A:
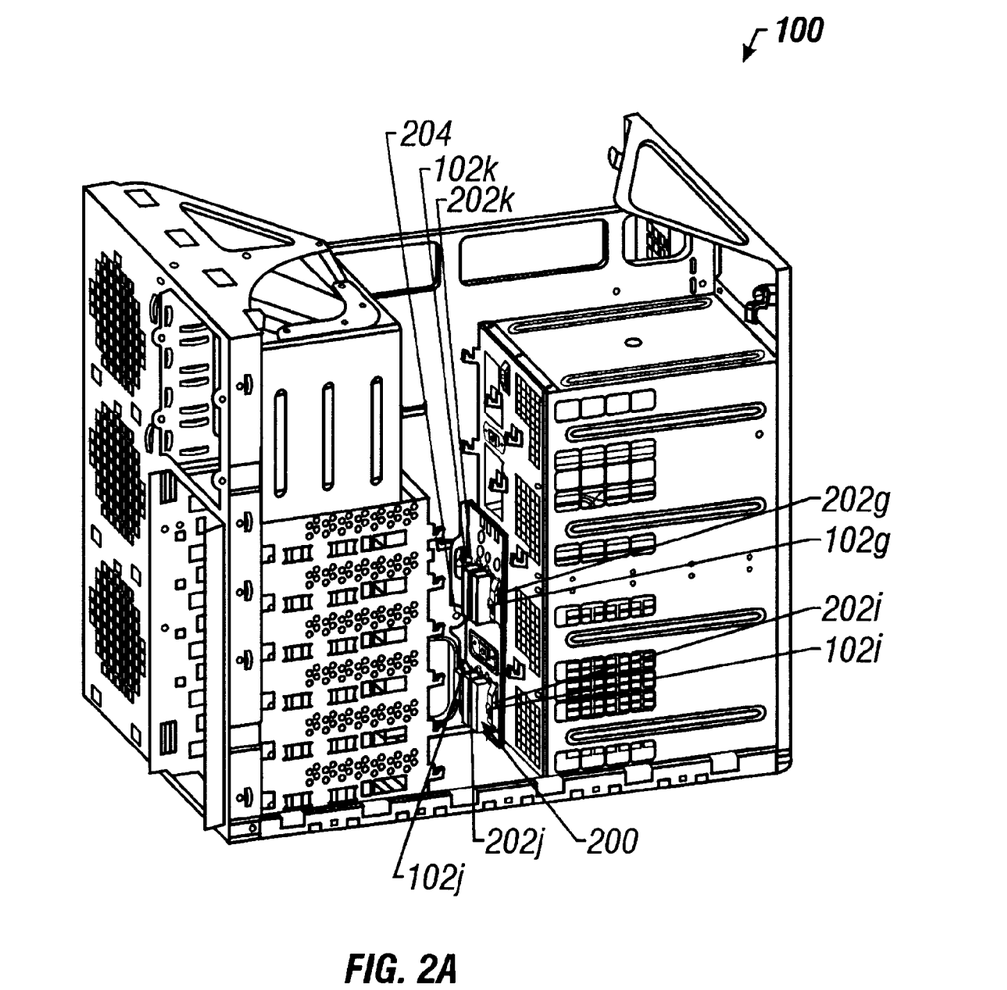
FIG. 2A illustrates the computer system of FIG. 1A in a single, nonredundant power supply configuration supporting a power coupling connector assembly circuit.

Referring to FIG. 2A, a connector assembly 200 is securely attached to chassis 100 by inserting mounting tabs 102g and 102j through corresponding receiving slots 202g and 202j, respectively. Receiving slots 202g and 202j are sufficiently elevated via respective elastic flaps to provide a compression fit with mounting tabs 102g and 102j. Once the tips of the mounting tabs 102g and 102j pass through receiving slots 202g and 202j, respectively, connector assembly 200 slides toward the base of chassis 100 and seats against the base of mounting tabs 102g and 102j. Mounting tabs 102g and 102j are sufficient to support connector assembly 200 and substantially prevent downward and side-to-side movement. A screw 204 is inserted through a side panel opening 206 of connector assembly 200 into chassis 100 to ensure a secure, motion free attachment regardless of the orientation of chassis 100. Openings 202*j* and 202*k* prevent interference between mounting tabs 102*j* and 102*k* during registration and seating of connector assembly 200. Registration, seating, and securing of connector assembly 200 may advantageously be accomplished using a screw driver to tighten screw 204 or without tools by using, for example, wing nuts or thumb screws to minimize tool usage. This simple but effective attachment method facilitates short assembly and replacement times. It will be recognized that other mechanisms may be used to removably attach and secure connector assembly 200 to chassis 100 including the use of bolts, latches, and nonpermanent adhesives.

Figure 2B:
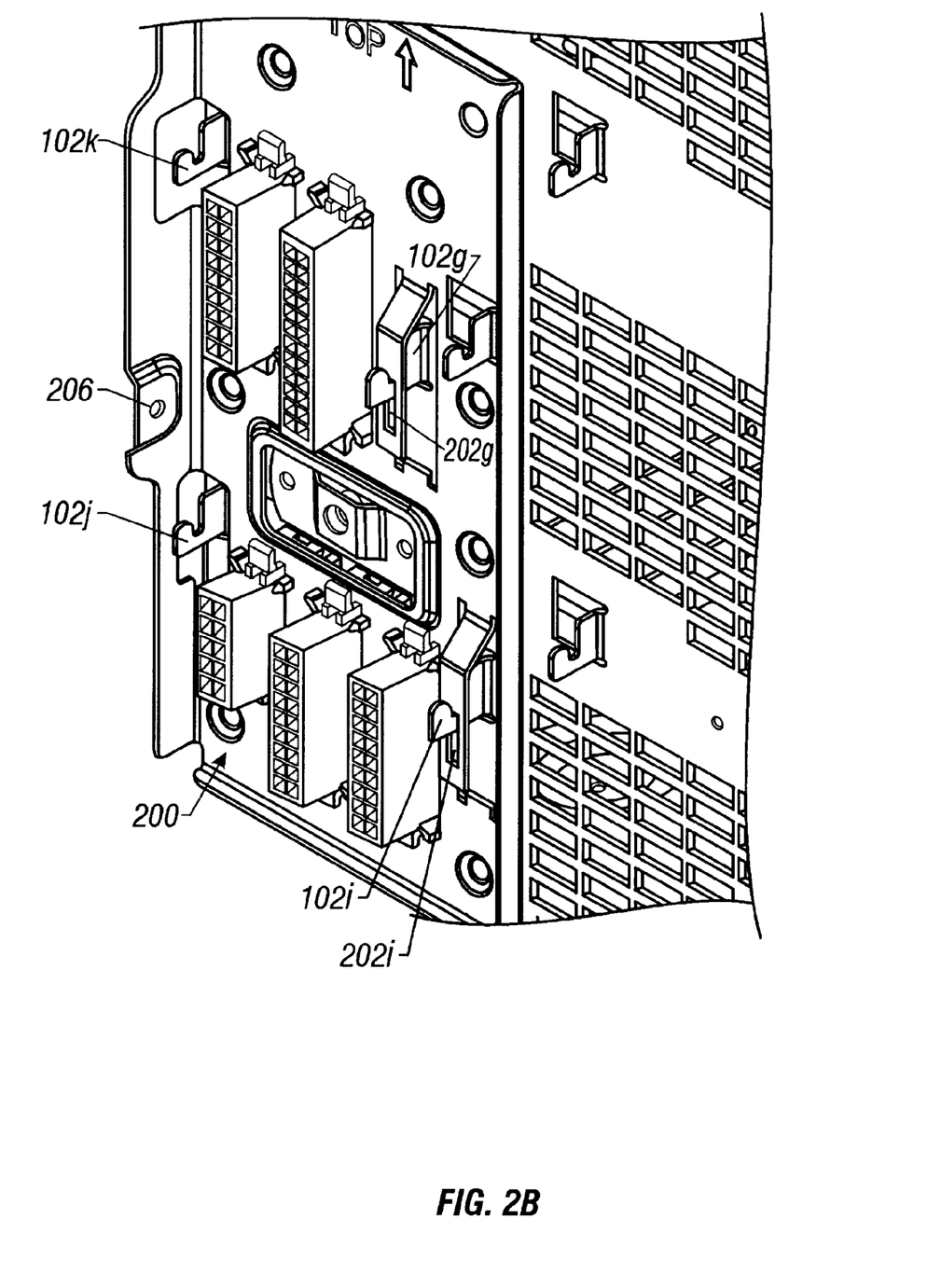
FIG. 2B illustrates an expanded view of mounting tabs supporting the power coupling connector assembly circuit of FIG. 2A.

Referring to FIG. 2B, an expanded view of connector assembly 200, mounting tabs 102, *g, i, j,* and *k*, and elevated receiving slots 202*g* and 202*j* are shown.

Figure 3A:
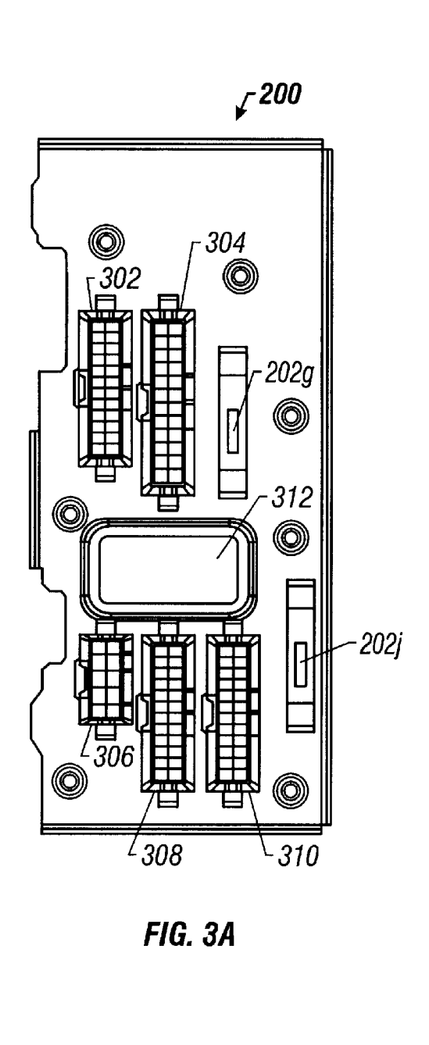
FIGS. 3A and 3B illustrate front and backside plan views of a connector assembly employed in the nonredundant power supply configuration of FIG. 2A.

Referring to FIG. 3A, the five connectors 302, 304, 306, 308, and 310, disposed on the front side or device side of the connector assembly 200, receive connectors 702, 704, 706, 708, and 710 (FIG. 7) attached to wiring harnesses 726, 728, 730, 732, and 734, respectively, to provide power to electronic devices 736, 738, 740, 742, and 744, respectively. Electronic devices 736, 738, 740, 742, and 744, which may be installed in the chassis 100 of electronic system 700, are, for example, a motherboard having a microprocessor and a memory coupled to the microprocessor that receive power through the motherboard, a floppy disk drive, a compact disk read only memory drive, a hard disk drive, and a backup device. The electronic devices 736, 738, 740, 742, and 744 are also coupled to the motherboard. The connector assembly 200 may be manufactured from any suitably rigid material such as steel or aluminum. Boss 312 protrudes from the otherwise flat surface of connector assembly 200 to provide clearance for underlying protrusions on backplate 103 when connector assembly 200 is attached to chassis 100.

Figure 3B:
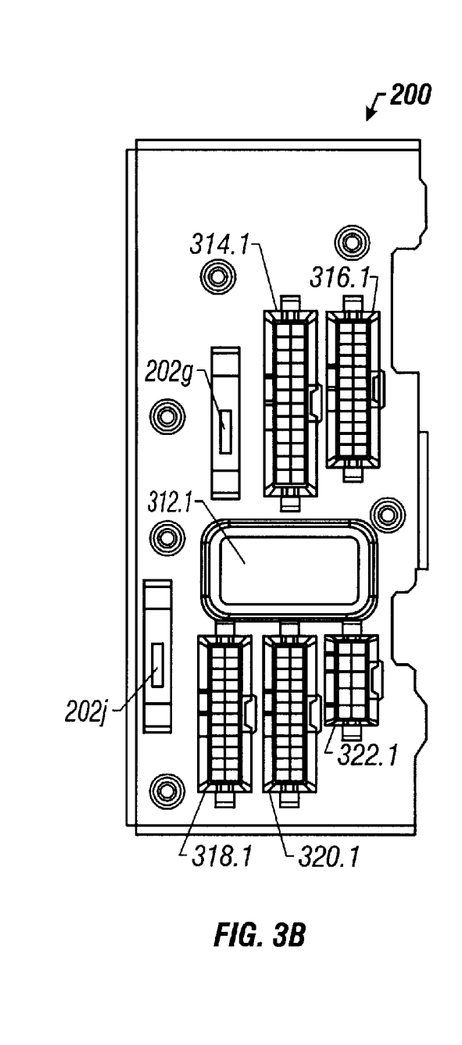

Referring to FIG. 3B, the five connectors 314.1, 316.1, 318.1, 320.1, and 322.1, disposed on the back side or power supply side of connector assembly 200, receive connectors (FIG. 7) from power supply 402.1 (FIG. 4) when power supply 402.1 is installed in power supply bay 106 (FIG. 1A).

Figure 4:
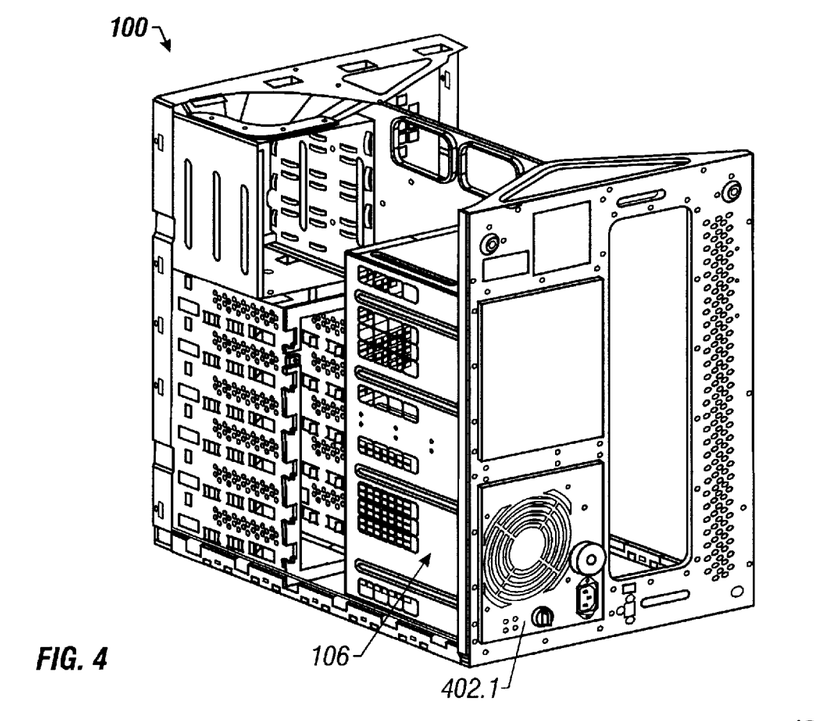
FIG. 4 illustrates the computer system of FIG. 2A from a power supply back panel perspective.

Referring to FIGS. 4 and 7, chassis 100 may be used as a frame for a computer system, such as a server, work station, or personal computer, or for other electronic systems such as a disk drive rack assembly system. When the chassis 100 is configured in a nonredundant, single power supply configuration, power supply 402.1 supplies all of the power requirements for electronic system 700 (FIG. 7), which may, for example, be a computer system. When power supply 402.1 is inserted into power supply bay 106, connectors 714.1, 716.1, 718.1, 720.1, and 722.1 of power supply 402.1 are accepted through the opening 108 (FIG. 1A) in power supply bay 106 and plug into corresponding connector assembly 200 connectors 314.1, 316.1, 318.1, 320.1, and 322.1. The connectors 714.1, 716.1, 718.1, 720.1, and 722.1 are connected to wiring harness 724.1 which during operation provides power and may also provide data information, such as a power supply disable signal, between power supply 402.1 and paralleling circuit board 500 (FIG. 5A).

Connector assembly 200 includes conductors 746 to route various voltage terminals and any data terminals from connectors 314.1, 316.1, 318.1, 320.1, and 322.1 to appropriate terminals of connectors 302, 304, 306, 308, and 310 so that electronic devices 736, 738, 740, 742, and 744 receive appropriate voltage source levels and any provided data via connectors 302, 304, 306, 308, and 310 and wiring harnesses 726, 728, 730, 732, and 734.

Figure 5A:
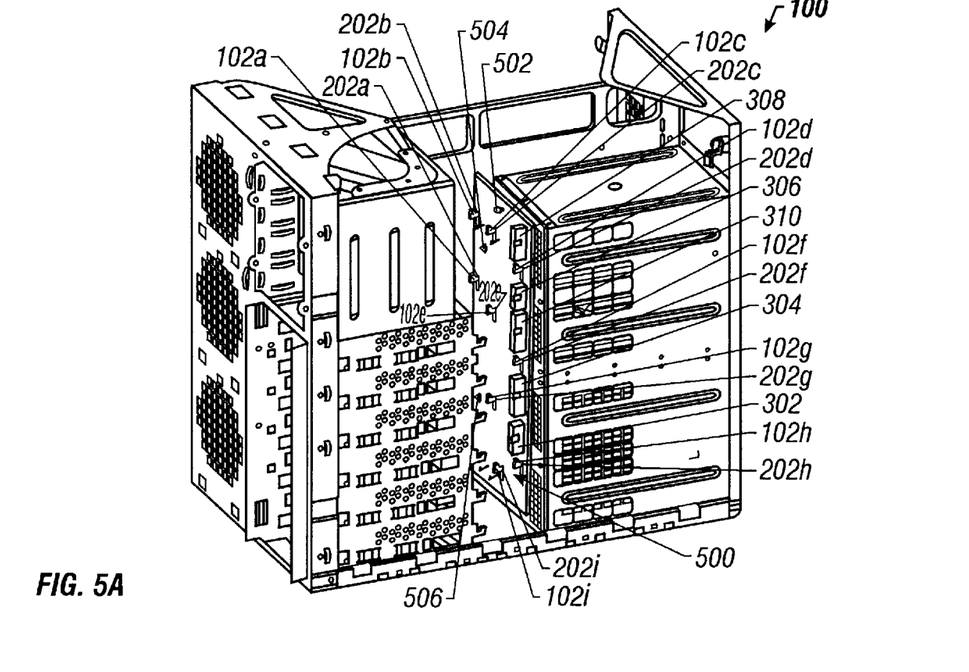
FIG. 5A illustrates the computer system of FIG. 1A in a multiple power supply configuration supporting a current sharing circuit board.

Referring to FIG. 5A, a current sharing or paralleling circuit board 500 is attached to chassis 100 when chassis 100 is configured in a multiple power supply configuration. The paralleling circuit board 500 is secured to the backplate 103 of two power supply bays 104 and 106 by inserting mounting tabs 102 through slots 202*a, b, c, d, e, f, g, h, i, j,* and *k*, respectively, (collectively referred to as slots 202) in paralleling circuit board 500. Once the tips of the mounting tabs 102 pass through receiving slots 202, respectively, paralleling circuit board 500 slides toward the base of chassis 100 and seats against the base of mounting tabs 102.

Figure 5B:
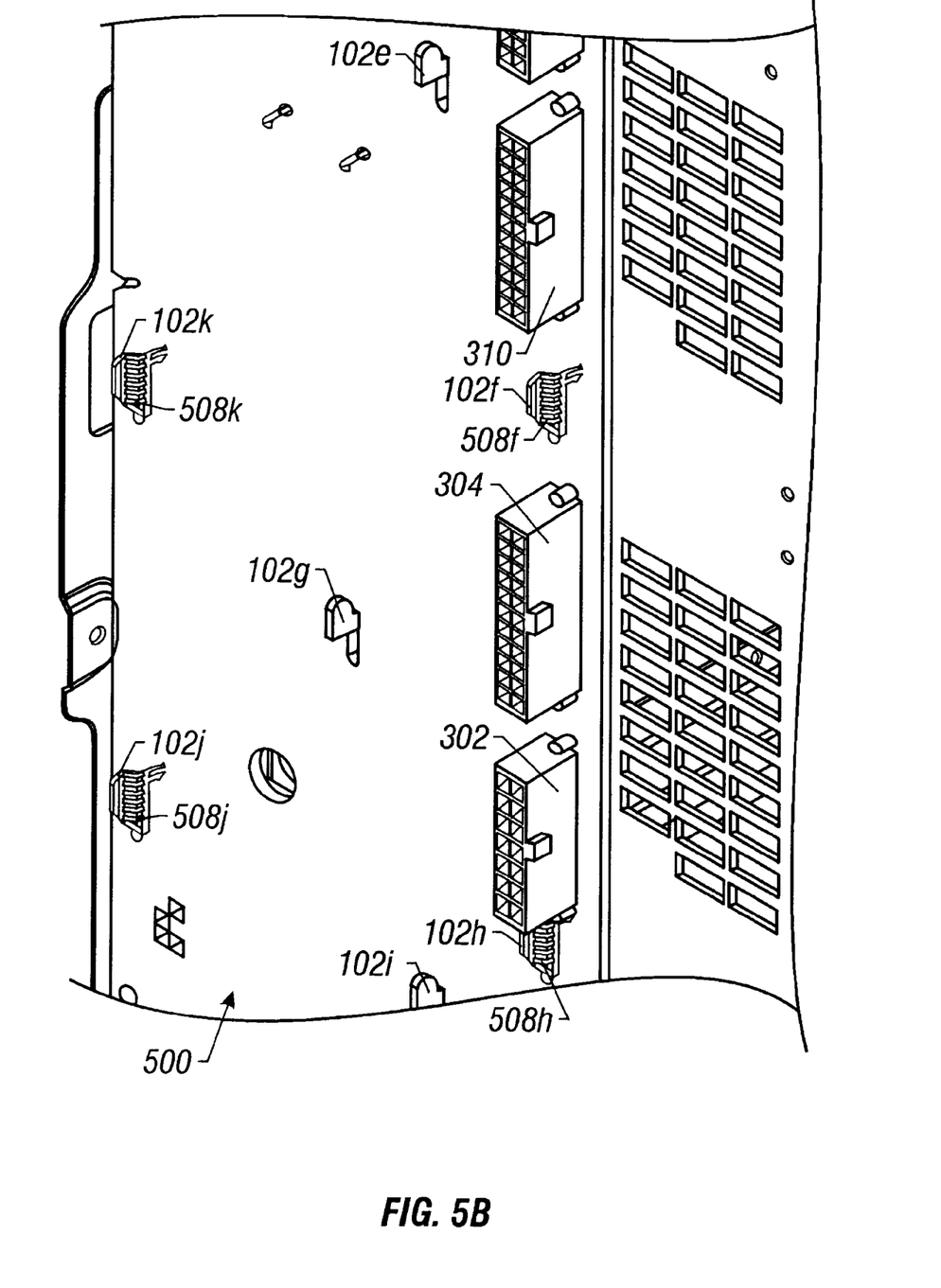
FIG. 5B illustrates an expanded view of mounting tabs supporting the current sharing circuit board of FIG. 5B.

Referring to FIG. 5B, an expanded view of a portion of paralleling circuit board 500 illustrates the support provided by mounting tabs 102*e, f, h, i, j,* and *k*. Ground clips 508*f, h, j,* and *k* contact mounting tabs 102*f, h, j,* and *k*, respectively, to provide a ground potential connection for paralleling circuit board 500. Other periphery mounting tabs 102*a, b,* and *d* contact ground clips 508*a, b,* and *d* (not shown), respectively, which are identical to ground clips 508*f, h, j,* and *k*. Posts, such as posts 510 and 512, may also be provided to provide registration and motion stability for paralleling circuit board 500.

Referring to FIGS. 1 and 5, raised aperture 112 receives thumb screw 502 and apertures 114 and 116 receive screws 504 and 506, respectively to secure paralleling circuit board 500 to chassis 100. The paralleling circuit board 500 effectively divides the power requirements of electronic system 800 (FIG. 8) approximately evenly among all power supply connected to the paralleling circuit board 500. If a power supply is disabled, paralleling circuit board 500 approximately evenly redistributes all power requirements among the remaining, functioning power supply modules. Paralleling circuit board 500 may be any of well-known current sharing boards such as the illustratively described paralleling circuit board in U.S. patent application Ser. No. 08/381, 044 by Nathan E. Wiscombe, filed Jan. 1, 1995 and entitled "Active Output Impedance Control for Current Sharing of Paralleled Power Supplies", which is herein incorporated by reference in its entirety.

Figure 6:
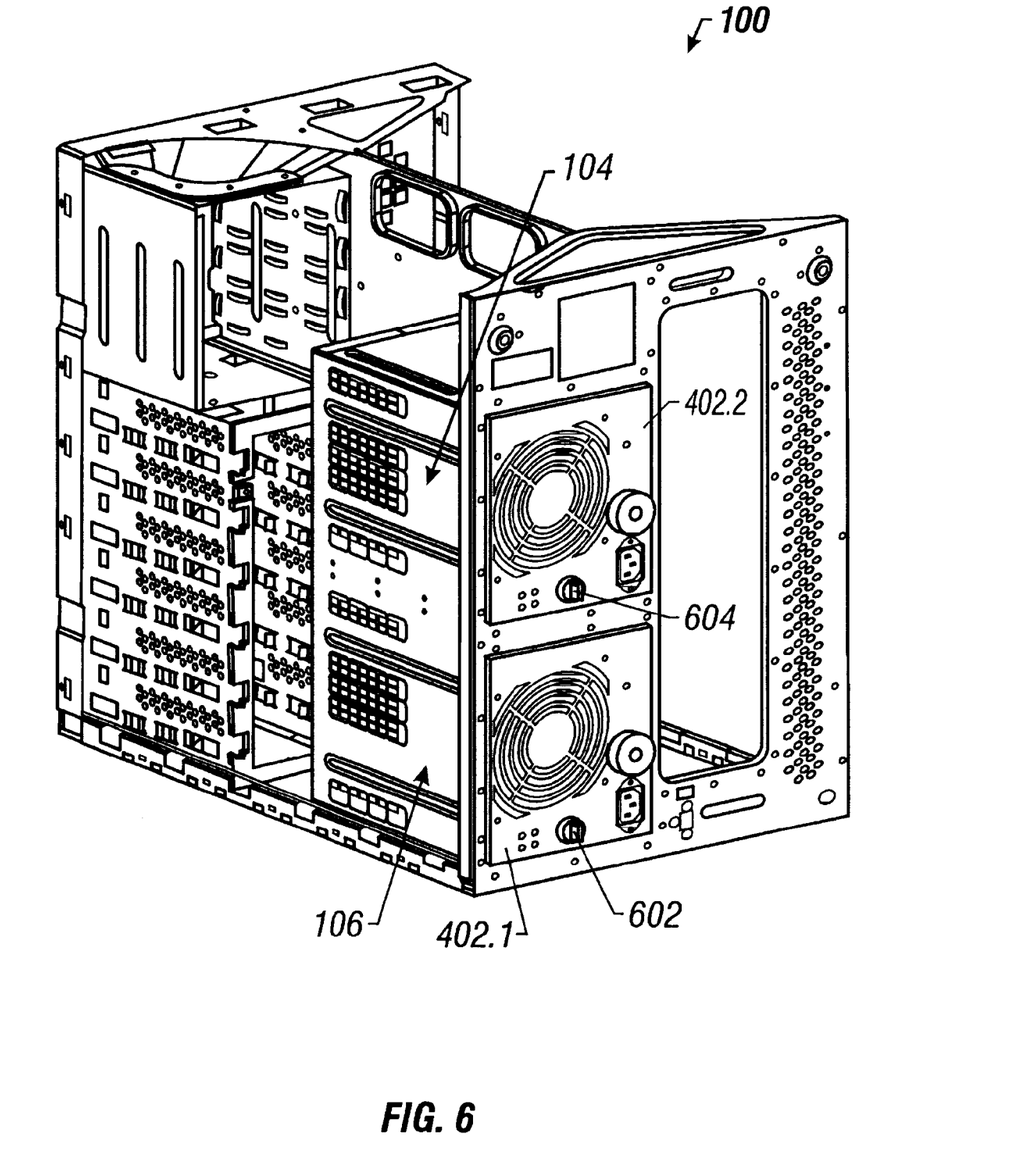
FIG. 6 illustrates the computer system of FIG. 5A from a back panel perspective.

Referring to FIGS. 5, 6, and 8, electronic system 800 is configured with paralleling board 500 which allows power supplies 402.1 and 402.2 to supply power to electronic system 800. With the exception of paralleling board 500 and power supplies 402.1 and 402.2, electronic system 800 is identical to electronic system 700. In the multiple power supplies configuration of electronic system 800, power supply 402.1 and 402.2 are installed in power supply bays 106 and 104, respectively, and secured into position with switches 602 and 604 and screws (not shown), respectively. When switches 602 and 604 are rotated to release power supplies 402.1 and 402.2, respectively, a data signal is sent to paralleling circuit board 500 indicating that the released power supply should be taken off line and power sharing discontinued.

Power supplies 402.1 and 402.2 may be identical and respectively utilize connectors 714.1, 716.1, 718.1, 720.1, and 722.1 and 714.2, 716.2, 718.2, 720.2, and 722.2 to connect respective wiring harnesses 724.1 and 724.2 to paralleling board 500. Paralleling board 500 receives connectors 714.1, 716.1, 718.1, 720.1, and 722.1 and 714.2, 716.2, 718.2, 720.2, and 722.2 with connectors 314.1, 316.1, 318.1, 320.1, and 322.1 and 314.2, 316.2, 318.2, 320.2, and 322.2, respectively. Electronic system 800 is redundantly supplied power when each of power supplies 402.1 and 402.2 is capable of supplying the entire power requirements of electronic system 800. In a nonredundant configuration, both power supplies 402.1 and 402.2 are required to supply the electronic system 800 power requirements.

Referring to FIGS. 1, 2, 5, 7, and 8, electronic system 700 is easily upgradeable from a nonredundant power supply configuration to a multiple power supply configuration of electronic system 800 by disconnecting power supply 402.1 from connectors 314.1, 316.1, 318.1, 320.1, and 322.1 of connector assembly 200, removing screw 204 and sliding connector assembly 200 toward the top of chassis 100. Once connector assembly 200 is removed, paralleling circuit board 500 may then be installed as described above. The same power supply 402.1 may be used in the redundant configuration by connecting to paralleling circuit board 500 as described above. Power supply 402.2 is inserted into power supply bay 104 and connected to paralleling circuit board 500 as described above. Because the connector sets 314.1, 316.1, 318.1, 320.1, and 322.1 and 314.2, 316.2, 318.2, 320.2, and 322.2 are identical, power supply 402 are interchangeable for computer systems 700 and 800 in both redundant and nonredundant configurations.

Electronic systems 700 and 800 use the same chassis 100, and, thus, electronic system 700 may be sold with the less expensive connector assembly 200 and easily upgraded to the multi-power supply electronic system 800 with minimal service time. Additionally, the interchangeability of power supplies 402.1 and 402.2 allows the same power supply to be used with both computer systems 700 and 800. Thus, either of computer systems 700 and 800 may be used to repair the other if necessary, and one type of power supply may be manufactured and stocked for both computer systems 700 and 800.

While the invention has been described with respect to the embodiments and variations set forth above, these embodiments and variations are illustrative and the invention is not to be considered limited in scope to these embodiments and variations. For example, chassis 100 may be equipped with X power supply bays and paralleling circuit board 500 may be equipped with X sets of connectors 314, 316, 318, 320, and 322 to accommodate X power supply 402, where X is an integer. Also, other well-known attachment features and mechanisms may be used to interchangeably secure connector assembly 200 and paralleling circuit board 500 to chassis 100. Additionally, connector assembly 200 may be modified with one or more additional sets of power supply side connectors to receive power from one or more additional power supply and modified to distribute power from power supply 402.1 and the one or more additional power supply to respective subsets of electronic devices in an electronic system. Furthermore, chassis 100 may be altered to accommodate different types of power supplies, electronics, and other devices and may be altered to reflect different considerations such as structural and aesthetic considerations. Accordingly, various other embodiments and modifications and improvements not described herein may be within the spirit and scope of the present invention, as defined by the following claims.

What is claimed is:

1. A computer system comprising:

a microprocessor;

a memory coupled to the microprocessor; and a chassis supporting the microprocessor and memory and having a support frame that includes attachment features which interchangeably receive: (i) a connector assemble which connects to first power supply in a nonredundant power supply configuration and (ii) current sharing circuit board which connects to a plurality of power supplies in a multiple power supply configuration.

2. The computer system as in claim 1 further comprising:

a motherboard attached to the chassis and coupled to the first power supply via the connector assembly when the computer system is configured in a nonredundant power supply configuration and coupled to the plurality of power supplies via the current sharing circuit board when the computer system is configured in the multiple power supply configuration, wherein the microprocessor and the memory are disposed on the motherboard.

3. The computer system as in claim 1 wherein the first power supply including wiring harnesses is substantially identical to each one of the respective plurality of power supplies.

4. The computer system as in claim 1 wherein the connector assembly includes connectors to receive connectors from the first power supply, and the current sharing circuit board includes a plurality of connector sets that each match the connector assembly connectors to respectively receive connectors from each of the plurality of power supplies.

5. The computer system as in claim 1 wherein the connector assembly includes a connector attached to a rigid supporting plate, wherein the rigid supporting plate includes attachment features complimentary to the attachment features of the support frame.

6. The computer system as in claim 5 wherein the support frame attachment features are arcuate tabs and the complimentary attachment features of the supporting plate are slots to receive the arcuate tabs.

7. The computer system as in claim 1 wherein the attachment features are distributed along the frame to rigidly retain the connector assembly and the current sharing circuit board.

8. The computer system as in claim 1 wherein the chassis includes a plurality of power supply bays, and the support frame attachment features are in receipt of the connector assembly when the computer system is configured in the nonredundant power supply configuration and in receipt of the current sharing circuit board when the computer system is configured in the multiple power supply configuration, the computer system further comprising:

circuitry disposed within the chassis and having current conductors coupled to the connector assembly when the computer system is configured in the nonredundant power supply configuration and coupled to the current sharing circuit board when the computer system is configured in the multiple power supply configuration;

wherein the first power supply includes current conductors coupled to the circuitry.

9. The computer system as in claim 8 wherein the circuitry includes a motherboard having a microprocessor and a memory coupled to the microprocessor and further includes a hard disk drive coupled to the motherboard, a disk drive coupled to the motherboard, and a compact disk read only memory drive coupled to the motherboard.

10. The computer system as in claim 1 wherein the computer system is a server.

11. The computer system as in claim 1 wherein the attachment features provide tool-free interchangeability.

12. The computer system as in claim 1 wherein the connector assembly consists of passive components.

13. The computer system as in claim 1 wherein the multiple power supply configuration assembly is capable of connecting the plurality of power supplies in a nonredundant power supply configuration, wherein any one of the respective power supplies in the multiple power supply, nonredundant configuration is incapable of delivering complete power requirements of an electronic system incorporating the chassis.

14. The computer system as in claim 1 wherein the multiple power supply configuration is a redundant power supply configuration.

15. The computer system as in claim 1 wherein two power supplies are capable of connecting to the current sharing board in the multiple power supply configuration.

16. An apparatus comprising:

a chassis having a support frame that includes attachment features which interchangeably receive: (i) a connector assembly which connects to a first power supply in a nonredundant power supply configuration and (ii) a current sharing circuit board which connects to a plurality of power supplies in a multiple power supply configuration.

17. The apparatus as in claim 16 further comprising:

electronic circuitry attached to the chassis and coupled to the first power supply via the connector assembly when the apparatus is configured in a nonredundant power supply configuration and coupled to the plurality of power supplies via the current sharing circuit board when the apparatus is configured in the multiple power supply configuration.

18. The apparatus as in claim 16 wherein the first power supply including wiring harnesses is substantially identical to each one of the respective plurality of power supplies.

19. The apparatus as in claim 16 wherein the connector assembly includes connectors to receive connectors from the first power supply, and the current sharing circuit board includes a plurality of connector sets that each match the connector assembly connectors to respectively receive connectors from each of the plurality of power supplies.

20. The apparatus as in claim 16 wherein the connector assembly includes a connector attached to a rigid supporting plate, wherein the rigid supporting plate includes attachment features complimentary to the attachment features of the support frame.

21. The apparatus as in claim 20 wherein the support frame attachment features are arcuate tabs and the complimentary attachment features of the supporting plate are slots to receive the arcuate tabs.

22. The apparatus as in claim 16 wherein the attachment features are distributed along the frame to rigidly retain the connector assembly and the current sharing circuit board.

23. The apparatus as in claim 16 wherein the chassis includes a plurality of power supply bays, and the support frame attachment features are in receipt of the connector assembly when the apparatus is configured in the nonredundant power supply configuration and in receipt of the current sharing circuit board when the apparatus is configured in the multiple power supply configuration, the apparatus further comprising:

circuitry disposed within the chassis and having current conductors coupled to the connector assembly when the apparatus is configured in the nonredundant power supply configuration and coupled to the current sharing circuit board when the apparatus is configured in the multiple power supply configuration;

wherein the first power supply includes current conductors coupled to the circuitry.

24. The apparatus as in claim 23 wherein the apparatus is a computer system and the circuitry includes a mother board.

25. The apparatus as in claim 24 wherein the computer system is a server.

26. The apparatus as in claim 16 wherein the attachment features provide tool-free interchangeability.

27. The apparatus as in claim 16 wherein the connector assembly consists of passive components.

28. The apparatus as in claim 16 wherein the multiple power supply configuration assembly is capable of connecting the plurality of power supplies in a nonredundant power supply configuration, wherein any one of the respective power supplies in the multiple power supply, nonredundant configuration is incapable of delivering complete power requirements of an electronic system incorporating the chassis.

29. The apparatus as in claim 16 wherein the multiple power supply configuration is a redundant power supply configuration.

30. The apparatus as in claim 16 wherein two power supplies are capable of connecting to the current sharing board in the multiple power supply configuration.

31. An electronic system comprising:

a motherboard having a microprocessor and a memory coupled to the microprocessor;

a first power supply when the electronic system is configured in a nonredundant power supply configuration;

a plurality of power supplies when the electronic system is configured in a redundant power supplies configuration;

a first means for distributing power to the motherboard from the first power supply when the electronic system is configured in the nonredundant power supply configuration;

a second means for distributing power to the motherboard from the plurality of power supplies when the electronic system is configured in the redundant power supplies configuration; and support means for supporting the motherboard and for supporting the first means when the electronic system is in the nonredundant power supply configuration and for supporting the second means when the electronic system is in the redundant power supplies configuration.

32. The electronic system of claim 31 wherein the electronic system is a computer system.

33. The electronic system of claim 31 wherein the electronic system is a disk drive rack assembly system.

34. The electronic system of claim 31 wherein the first means for distributing power to the circuitry includes a plate having a connector disposed to mate with a wiring harness connector of the first power supply and includes a wiring harness coupled to the circuitry.

35. The electronic system of claim 31 wherein the first means for distributing power includes a power supply paralleling board and respective conductors coupled between the paralleling board and the plurality of power supplies and coupled between the circuitry and the paralleling board.

36. A method of implementing redundant and nonredundant power supply configurations in an electronic system comprising the steps of:

supporting a passive connector assembly with attachment features to connect to a power supply in a nonredundant power supply configuration;

coupling the connector assembly to power utilizing circuitry in the nonredundant power supply configuration;

supporting an active current sharing circuit board with the attachment features to couple to a plurality of power supplies in a redundant power supply configuration; and coupling the current sharing circuit board to the power utilizing circuitry in the redundant power supply configuration.

37. The method as in claim 36 wherein the step of supporting a passive connector assembly with attachment features comprises the steps of:

engaging registration protrusions disposed on a frame of the electronic system with complimentary slots disposed in the connector assembly to retain the connector assembly in a substantially fixed position in relation to the frame.

38. The method as in claim 36 wherein the power supply in the nonredundant power supply configuration is substantially identical to each one of the respective plurality of power supplies in the redundant power supply configuration.

39. The method as in claim 36 further comprising the steps of: supplying power to circuitry of the electronic system from one or more of the plurality of power supplies when the electronic system is configured in the redundant power supply configuration.

40. The method as in claim 36 wherein the step of supporting a passive connector assembly comprises the step of: supporting the passive connector assembly with tool-free attachment features; and the step of supporting the active current sharing circuit board comprises the step of:

supporting the active current sharing board with the tool-free attachment features.

* * * * *